United States Patent [19]
Takagi et al.

[11] Patent Number: 5,630,859
[45] Date of Patent: May 20, 1997

[54] OPTICAL ELEMENT FORMING METHOD

[75] Inventors: Kazuaki Takagi; Takashi Inoue, both of Osaka, Japan

[73] Assignee: Matsushita Electric Industrial Co., Ltd., Osaka, Japan

[21] Appl. No.: 319,646

[22] Filed: Oct. 7, 1994

[30]  Foreign Application Priority Data

Oct. 8, 1993 [JP] Japan ................... 5-252848
May 24, 1994 [JP] Japan ................... 6-109663

[51] Int. Cl.$^6$ ......................................... C03B 23/00
[52] U.S. Cl. .................... 65/102; 65/25.1; 65/37; 65/64; 65/66; 65/68; 65/72; 65/275; 65/286; 65/292; 65/305; 264/1.21; 264/2.7; 425/808; 359/642
[58] Field of Search ................... 65/37, 64, 66, 65/102, 25.1, 68, 72, 292, 286, 305, 275; 264/1.21, 2.7; 425/808; 359/642

[56]  References Cited

U.S. PATENT DOCUMENTS 5,032,160  7/1991  Murata et al. .
5,188,650  2/1993  Nomura .

FOREIGN PATENT DOCUMENTS 0078658   5/1983  European Pat. Off. .
0463463   1/1992  European Pat. Off. .
58-84134  5/1983  Japan .
63-176319 7/1988  Japan .
3-050126  3/1991  Japan .
3-50126   3/1991  Japan .
4-012034  1/1992  Japan .

*Primary Examiner*—Donald E. Czaja
*Assistant Examiner*—Michael Philip Colaianni
*Attorney, Agent, or Firm*—McDermott, Will & Emery

[57]  ABSTRACT

In forming a plano-convex lens from a column-like lens blank by heating the blank to a temperature higher than the transition temperature thereof and by pressurizing an upper die with a closed space formed between the blank and the upper die, there are alternately repeated operations of pressurizing the upper die and stopping the application of pressure thereto. Through the control of the amount of displacement of the upper die, the maximum pressure of gas in the closed space at each pressurizing step is so controlled: as to be low according to the surface viscosity of the blank to the extent that no local concave deformation in the surface of the blank is produced; and as to be high to the extent that gas caught in the closed space is discharged at each step of stopping the application of pressure.

3 Claims, 8 Drawing Sheets

OPTICAL ELEMENT FORMING METHOD

BACKGROUND OF THE INVENTION

The present invention relates to an optical element forming method and more particularly to a method of forming an economical optical element of high precision as to shape and surface and suitable for mass-production.

To produce an optical element such as a lens, a prism or the like, there is recently known, instead of a method of grinding an optical element blank such as glass, plastic or the like, a method of previously preparing an optical element blank in a predetermined shape, feeding this blank in a forming mold, heating and then forming the blank under pressure (for example, Japanese Laid-Open Patent Publication No. 58-84134). As to such an optical element blank to be used for forming under pressure, the shape thereof is desired to be as simple as possible in view of workability and cost. As a typical example, there is proposed a forming method with the use of a column-like blank (for example, Japanese Laid-Open Patent Publication No. 3-50126).

In a conventional forming method, the forming operation has been conducted while eliminating gas in a closed space between the blank and the mold by alternately repeating pressurizing and stopping the application of pressure. However, such a method presents the problems that the forming precision is unstable, resulting in low yield, and that predetermined precision is reached only with difficulty. Further, to obtain an optical element having a predetermined center thickness Y and a predetermined optically effective surface diameter ⌀EFF, there has been used a column-like blank of which center thickness X is greater than Y and of which both end surfaces and lateral surface are mirror-finished. This disadvantageously increases the cost of the optical element.

SUMMARY OF THE INVENTION

It is an object of the present invention to provide a method of economically producing a high-precision optical element in a stable manner.

To achieve the object above-mentioned, the present invention provides a first method in which pressurizing and pressure-reducing steps are repeatedly alternately carried out such that the maximum pressure of gas in the closed space between a blank and a forming mold at each pressurizing step, is so controlled: as to be low according to the surface viscosity of the blank such that no local concave in the surface of the blank is produced; and as to be high such that there is formed, between the blank and the forming mold, a passage through which the gas in the closed space is to be discharged at each pressure-reducing step.

According to the first forming method, there can be carried out a highly precise forming which produces no crater-like gas hole in the transfer surface of the blank. More specifically, the gas in the closed space can be discharged with no detrimental deformation generated on the blank, such that a highly precise optical element can stably be produced.

To achieve the object above-mentioned, the present invention also provides a second forming method in which a blank is pressurized with a forming mold, thereby to exert, to the blank, force to be decomposed toward the center of each of the end surfaces of the blank, such that the blank is deformed, under pressure, to an optical element of which center thickness Y is not less than the center thickness X of the blank (X≦Y). Further, to form an optical element provided outside of the optically effective surface thereof with a coarse surface, there is selected, as the optical element blank, a cylindrical body having a coarse lateral surface and mirror-finished end surfaces each having a diameter ⌀D greater than the optically effective surface diameter ⌀EFF of the resulting optical element.

According to the second forming method, the center thickness X of the blank can be determined with no restrictions exerted thereto by the center thickness Y of the resulting optical element.

DETAILED DESCRIPTION OF THE INVENTION

The following description will discuss first and second embodiments of the present invention with reference to the attached drawings. The following description will discuss how to form a plano-convex lens and a convexo-convex lens in the first and second embodiments, respectively.

(First Embodiment)

Figure 1:
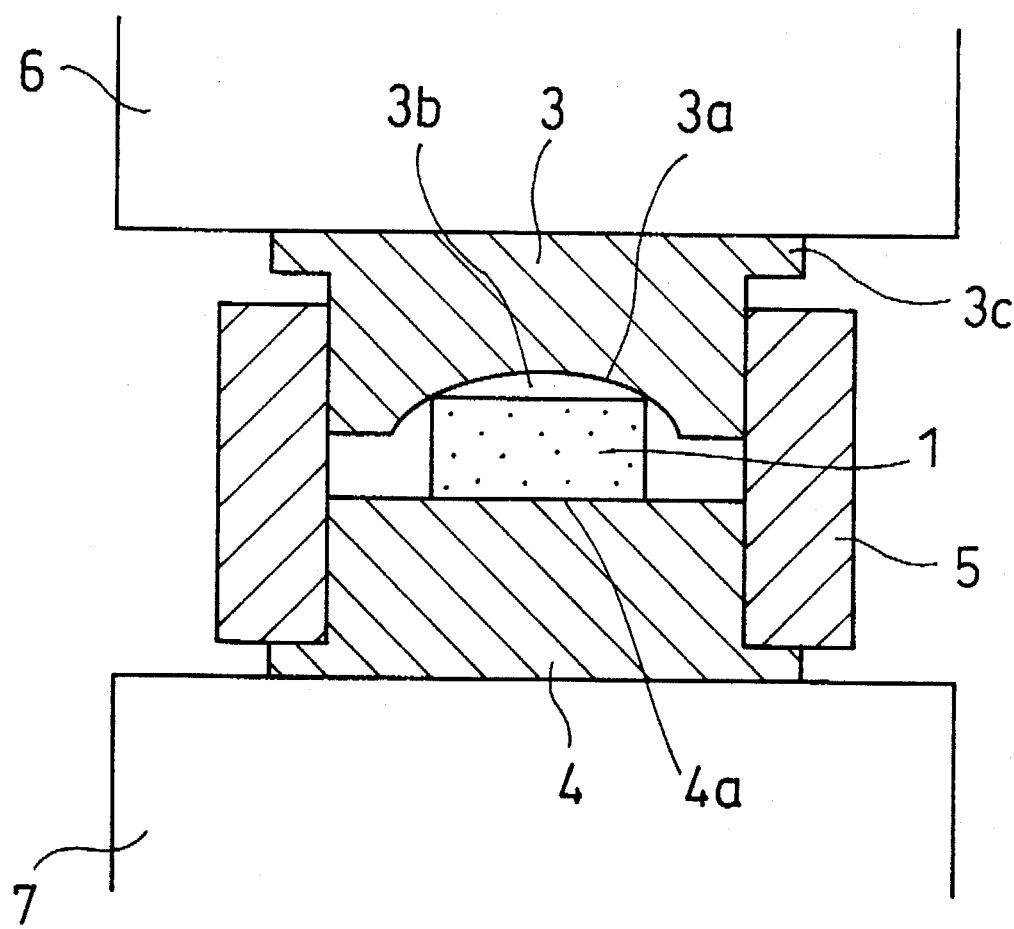
FIG. 1 is a section view of a forming apparatus used in a first embodiment of the present invention.
Figure 3:
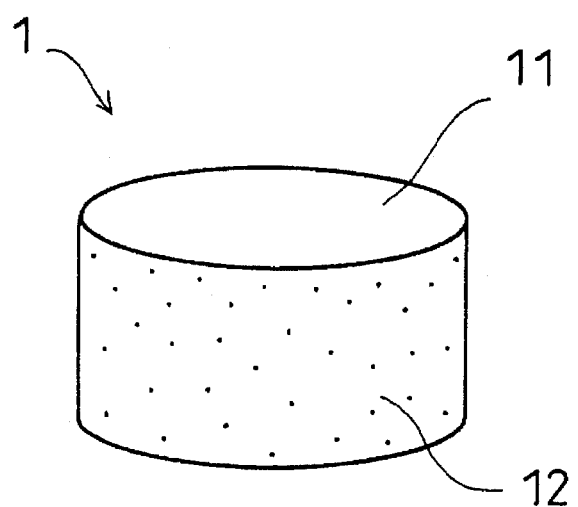
FIG. 3 is a perspective view of an optical element blank used in the first embodiment.
Figure 4:
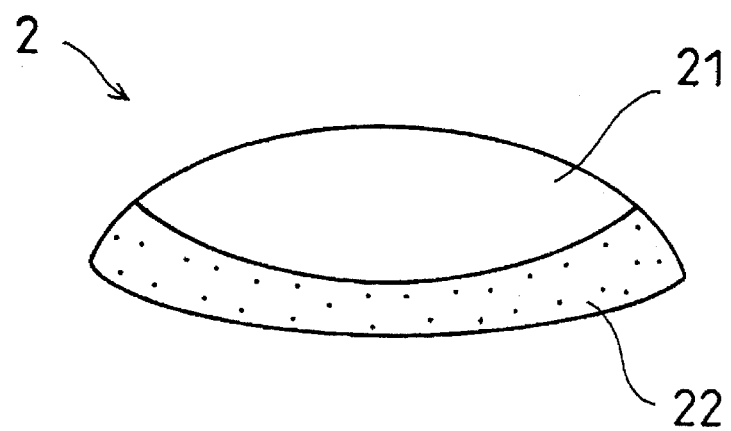
FIG. 4 is a perspective view of an optical element formed in the first embodiment.

In a forming apparatus in FIG. 1, a forming mold has an upper die 3, a lower die 4 and a trunk die 5. The upper die 3 and the lower die 4 are vertically slidably disposed in the trunk die 5 such that these dies 3, 4, 5 are coaxial. An optical element blank 1 is to be fed into a space formed by the upper die 3, the lower die 4 and the trunk die 5. As shown in FIG. 3, the optical element blank 1 is a cylindrical body of which a pair of opposite end surfaces 11 are mirror-finished surfaces and of which lateral surface 12 is a coarse surface. As shown in FIG. 1, the blank 1 is placed in the forming mold such that the end surfaces 11 are respectively opposite to an upper mold forming surface 3a which is a concave surface, and to a lower mold forming surface 4a which is flat. Between the upper die 3 and the lower die 4, there is formed a gap of which size is determined when the flange 3c of the upper die 3 comes in contact with the upper end of the trunk die 5. By the size of this gap, the optical element blank 1 is formed to an optical element (plano-convex lens) 2 with a predetermined thickness having mirror surface portions 21 and a coarse surface portion 22 as shown in FIG. 4.

In FIG. 1, a pressurizing stage 6 incorporates a heating source. A pressurizing force for pushing down the upper die 3 is to be transmitted through this pressurizing stage 6. More specifically, the pressurizing stage 6 is driven downward by, for example, a hydraulic pump (not shown) to transmit, to the upper die 3, force for pressurizing the optical element blank 1. By the hydraulic pump, the pressurizing stage 6 can be driven not only downwardly but also upwardly, and can also be stopped in the middle course of such a vertical movement. Further, the pressurizing stage 6 is so controlled as to change the pushing force to be exerted to the upper die 3. Accordingly, the pressurizing force to be exerted to the blank 1 by the upper die 3 can also be lowered to an optional level or set to zero in the middle course of a forming operation. A forming stage 7 incorporates a heating source and is stationary. By the heating sources incorporated in the pressurizing stage 6 and the forming stage 7, the upper die 3, the lower die 4 and the blank 1 can be controlled to the desired temperature.

The following description will discuss a method of forming an optical element (plano-convex lens) 2 with the use of the forming apparatus having the arrangement above-mentioned.

Figure 2:
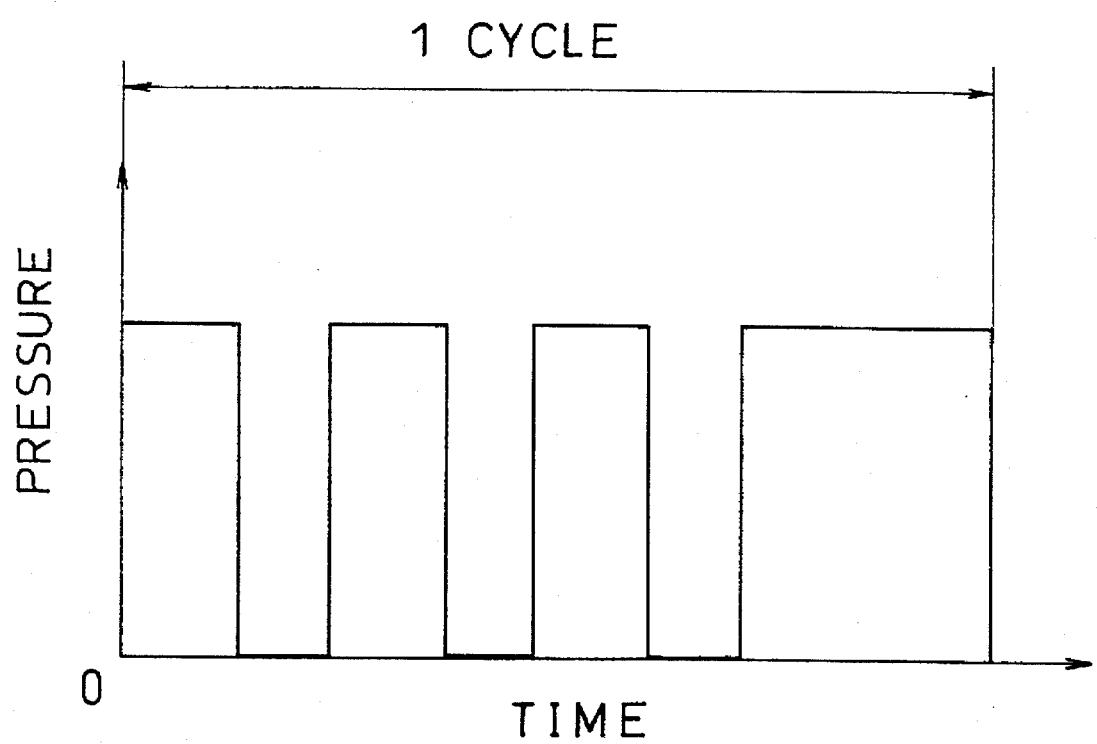
FIG. 2 is a profile view illustrating the relationship between pressure and a period of time when conducting an operation of forming under pressure according to the first embodiment.

The optical element blank 1 is disposed such that one end surface of the blank 1 comes in contact with the lower mold forming surface 4a, and the upper die 3 is then inserted into the trunk die 5 such that the other end surface of the blank 1 comes in contact with the upper mold forming surface 3a. At this time, there is formed a closed space 3b between the optical element blank 1 and the upper die 3. Then, the heating sources incorporated in the pressurizing stage 6 and the forming stage 7 are turned on to heat the optical element blank 1 to a predetermined temperature, and pressure is supplied to the pressurizing stage 6 such that the upper die 3 starts pushing the optical element blank 1. There is adopted a pressurizing method presenting a pressurizing pattern as shown in FIG. 2, in which a predetermined pressurizing force is applied to the upper die 3 and the pressurizing force to be applied to the upper die 3 is set to zero several times during one cycle. More specifically, pressurizing and stopping the application of pressure are alternately repeated in order to discharge gas caught in the closed space 3b between the optical element blank 1 and the upper die 3. While pressurizing and stopping the application of pressure are alternately repeated in such a manner, the deformation of the blank 1 under pressure is finished with the flange 3c of the upper die 3 coming in contact with the end surface of the trunk die 5. Thereafter, the heating sources are turned off to cool the upper and lower dies 3, 4 and the blank 1 thus formed under pressure, and the pressurizing force to be applied to the upper die 3 is brought to zero. When the temperature of the blank 1 thus formed under pressure or optical element 2 is lowered to room temperature, the forming mold is opened and the optical element 2 is taken out.

Figure 5A:
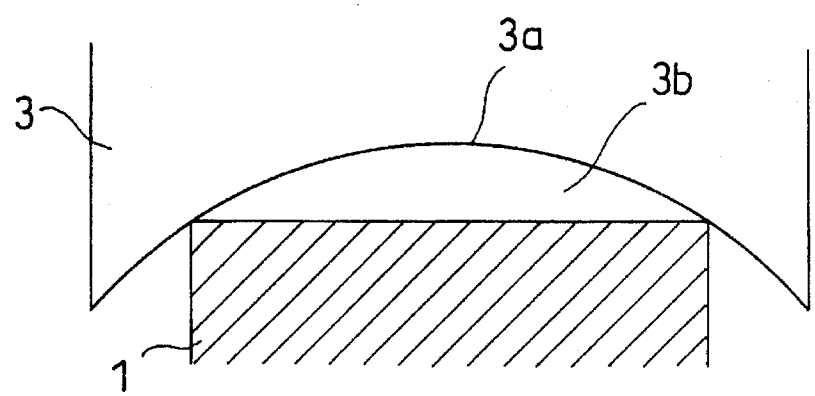
FIG. 5A to FIG. 5C are views illustrating a mechanism of discharging gas caught between forming molds and an optical element blank.

The following description will discuss a mechanism of discharging gas caught in the closed space 3b (See FIG. 5A).

Figure 5B:
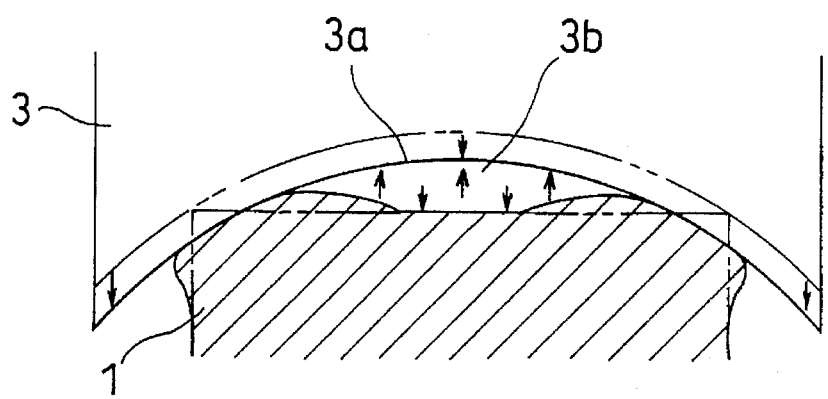

At the pressurizing operation by the pressurizing stage 6, since the upper die 3 pushes the optical element blank 1 to cause the blank 1 to be deformed, the volume of the closed space 3b becomes smaller as shown in FIG. 5B. In this connection, the gas in the closed space 3b is compressed. However, since the upper die 3 is pushed down and comes in close contact with the periphery of the optical element blank 1, the gas in the closed space 3b is not discharged outside. Thus, the closed space 3b is reduced in volume and the gas caught therein is increased in pressure.

Figure 5C:
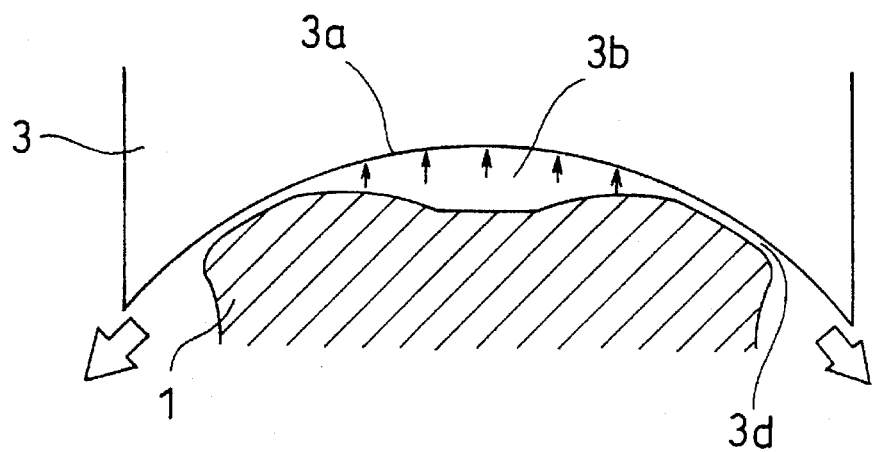

Next, when the pressurizing stage 6 is moved upward and slightly separated from the upper die 3 such that the pressurizing force to be applied to the upper die 3 is brought to zero (stopping the application of pressure), the gas caught in the closed space 3b is discharged. By bringing the pressurizing force to be applied to the upper die 3 to zero, there is provided a state where only the own weight of the upper die 3 is applied to the blank 1. In such a situation, the state of close contact between the periphery of the optical element blank 1 and the upper mold forming surface 3a, becomes loose as compared with a situation where the pressurizing force is applied to the upper die 3 by the pressurizing stage 6. In addition, under the influence of a high pressure of the gas caught in the closed space 3b, a gas passage 3d is partially formed between the upper die 3 and the blank 1 as shown in FIG. 5C. It is considered that the caught gas under a high pressure momentarily flows outside through this gas passage 3d. Thus, by bringing, to zero, the pressurizing force to be applied to the upper die 3 by the pressurizing stage 6, the gas in the closed space 3b quickly flows outside and the pressure in the closed space 3b is momentarily returned to the initial atmospheric pressure.

From the state above-mentioned, the pressurizing operation is again carried out to further deform the optical element blank 1. When the gas caught in the closed space 3b is increased in pressure, the pressurizing force is again brought to zero, thereby to discharge the caught gas outside. Thus, deforming the optical element blank 1 under pressure is carried out by alternately repeating pressurizing and stopping the application of pressure. Accordingly, while discharging the gas caught in the closed space 3b, the optical element blank 1 is formed such that the shape of the upper mold forming surface 3a is transferred to the optical element blank 1.

When the amount of displacement of the upper die 3 is made constant at each of the pressurizing steps when pressurizing and stopping the application of pressure are alternately repeated in the manner above-mentioned, the pressures of the gas in the closed space 3b at the respective pressurizing steps, are different from one another. That is, since the shape of the upper mold forming surface 3a is spherical or non-spherical, the volume of the closed space 3b varies in a non-linear manner with the amount of downward displacement of the upper die 3. Accordingly, if the gas pressure in the closed space 3b is increased, even temporarily, to the extent that the surface of the optical element blank 1 can be deformed, such a gas pressure necessarily produces an unexpected irregular deformation (non-reproducible deformation) on the surface of the optical element blank 1. Such a deformation may be limited to a small area only, but may also remarkably appear. Further, such a deformation may appear at the center of the optical element blank 1, but may also appear at the periphery thereof. Thus, there is no reproducibility. When the deformation is limited to a small area, this means that the surface strength of the optical element blank 1 copes with the gas pressure. In such a case, even though no definite deterioration of forming precision is observed at first glance, it is difficult to achieve forming precision equal to or better than a predetermined precision. Further, when the gas pressure in the closed space 3b is considerably high, there is formed a gas hole in the transfer surface of the formed optical element, thus provoking a defective transfer.

Further, if the gas pressure in the closed space 3b is too low, it is not good either. More specifically, when the gas pressure in the closed space 3b is too low, it is not possible to form, between the upper die 3 and the blank 1, a non-contact portion serving as the gas passage 3d, so that the gas remains confined in the closed space 3b. When the next pressurizing operation is carried out in the state above-mentioned, the gas in the closed space 3b is further increased in pressure, resulting in the formation of a detrimental concave in the surface of the optical element. Accordingly, the pressure of the gas in the closed space 3b generated in the course of deformation of the blank 1 under pressure, should neither be too high to the extent that the blank 1 is deformed, nor too low to the extent that no gas passage 3d is formed between the upper die 3 and the blank 1.

The following description will discuss a specific example of the optical element forming method based on the finding above-mentioned. In the following specific example, there is discussed a method of forming an optical element (plano-convex lens) 2 having the center thickness of 2.9 mm and an optically effective surface diameter of 6.86 mm.

The optical element blank 1 was a cylindrical body of an optical glass VC-79 (transition temperature: 516°, surface viscosity at this temperature: $10^{12.75}$ poise, coefficient of linear expansion in the temperature range from 100° C.-300° C.: $93 \times 10^{-7}$/° C.) having a diameter of 6.88 mm and a thickness of 2.95 mm. This blank 1 was supplied onto the lower mold forming surface $4a$, and the upper die 3 was then inserted along the trunk die 5 such that the upper mold forming surface $3a$ came in contact with the blank 1. At this time, the volume of the closed space $3b$ between the upper die 3 and the optical element blank 1 was 20.3 mm$^3$, and the amount of downward movement of the upper die 3 until the forming operation was complete, was 1.059 mm.

Then, the heating sources were turned on to heat the blank 1 for 70 seconds at each of 540° C., 580° C. and 555° C. That is, the blank 1 was heated for 3.5 minutes totally. At the final point of this heating operation, the surface viscosity of the blank 1 was $10^{10.2}$ poise.

With the temperature of the heating sources maintained at 555° C. such that the surface viscosity of the blank 1 was maintained at $10^{10.2}$ poise, a force of 285 kgf was supplied to the pressurizing stage 6 to cause the upper die 3 to start pushing the blank 1. The first pressurizing operation was carried out for 5 seconds to move the upper die 3 in the downward direction by 530 μm along the trunk die 5. Accordingly, the volume of the closed space $3b$ between the upper die 3 and the optical element blank 1 was changed by about 15.2 mm$^3$ from the initial value of 20.3 mm$^3$ to 5.08 mm$^3$. At this pressurizing operation, the upper die 3 always came in contact with the periphery of one end surface of the blank 1. Accordingly, the gas caught in the closed space $3b$ could not escape to the outside. This change in volume increased the pressure of the gas caught in the closed space $3b$ from atmospheric pressure to about 3.9 kgf/cm$^2$.

Then, to bring the pressurizing force by the pressurizing stage 6 to zero, the pressurizing stage 6 was moved upward such that the pressurizing stage 6 did not come in contact with the upper die 3. This caused the own weight 33.2 g of the upper die 3 only to be applied to the optical element blank 1. As above-mentioned, however, the high gas pressure in the closed space $3b$ which had been increased to about 3.9 kgf/cm$^2$, loosened the state of close contact between the upper die 3 and the periphery of the optical element blank 1 to locally form a non-contact part therebetween. This served as the gas passage $3d$, through which the gas caught in the closed space $3b$ was momentarily discharged outside. This caused the pressure in the closed space $3b$ to be returned to atmospheric pressure. Such a discharge of gas in the closed space $3b$ was instantaneously carried out, and the non-contact part serving as the gas passage $3d$ between the upper die 3 and the blank 1 was immediately returned to the close contact state. This prevented the forming precision from being deteriorated. After the caught gas had been discharged in the manner above-mentioned, the optical element blank 1 and the upper die 3 came in close contact with each other to form again the closed space $3b$. However, the volume of the closed space $3b$ was equal to 5.08 mm$^3$ which was smaller than the initial one, and the pressure in the closed space $3b$ was equal to atmospheric pressure.

At the second pressurizing operation, the force to be applied to the pressurizing stage 6 was set to 285 kgf identical with that in the first pressurizing operation, and the pressurizing operation was carried out until the blank 1 was deformed by a downward displacement by 280 μm of the upper die 3 along the trunk die 5. By this pressurizing operation, the volume of the closed space $3b$ was reduced by 3.81 mm$^3$ from 5.08 mm$^3$ to 1.27 mm$^3$. By this volume change, the gas pressure in the closed space $3b$ became equal to about 3.9 kgf/cm$^2$ as in the first pressurizing operation.

Thereafter, when the pressure to be applied to the pressurizing stage 6 was set to zero as done in the previous process, the compressed gas in the closed space $3b$ was discharged outside, causing the pressure therein to be again returned to atmospheric pressure. It is a matter of course that the second pressurizing operation caused the blank 1 to be formed under pressure into a shape nearer to the final product than the shape formed at the time of completion of the first pressurizing operation.

By each of the third to fifth pressurizing operations, the blank 1 was deformed under pressure such that the maximum gas pressure in the closed space $3b$ became equal to about 3.9 kgf/cm$^2$ as done in each of the first and second pressurizing operations. By alternately repeating the pressurizing and pressure-reducing operations several times, the blank 1 was formed to a shape nearer to the final product while most of the gas in the closed space $3b$ was discharged.

At the final pressurizing operation, with the pressurizing force maintained constant, pressure was supplied from the pressurizing stage 6 to the upper die 3 to cause the flange $3c$ of the upper die 3 to come in close contact with the trunk die 5 of which thickness had previously been adjusted such that the resulting optical element 2 had the desired thickness. About 42 seconds was taken before the upper die 3 came in close contact with the trunk die 5 after the pressure feed had been started. At this time, the volume in the forming mold (the volume of the space defined by the upper and lower dies 3, 4 and the trunk die 5) was 315.23 mm$^3$, and the volume of the optical element (plano-convex lens) 2 thus formed, was 109.67 mm$^3$. This presented a volume ratio of 34.8% with respect to the volume in the dies and consequently, the space in the dies was not fully charged with the optical element 2. Further, the circumferences of the optical element 2 did not come in contact with the inner peripheral surface of the trunk die 5.

Then, when the pressurizing force was reduced and the optical element 2 was cooled for 2 minutes to 480° C., the pressure feed was stopped to set the pressure to zero. When the temperature of the optical element 2 in the mold became equal to room temperature, the mold was opened and the optical element 2 was taken out.

In the optical element 2 thus prepared, the center thickness was 2.903 mm and the transfer precision was λ/4. Further, the optical element 2 presented no external defects as shown in FIG. 4. Here, k refers to the wavelength of laser with which the transfer precision is measured, and is specifically equal to 0.6328 μm. It is noted that the coarse surface portion 22 of the optical element 2 was formed outside of the optically effective surface, thus producing no problem in view of optical performance.

The following description will discuss a comparative example obtained under forming conditions different from those above-mentioned, with the use of a forming apparatus and an optical element blank identical with those used in the specific example above-mentioned.

Figure 6A:
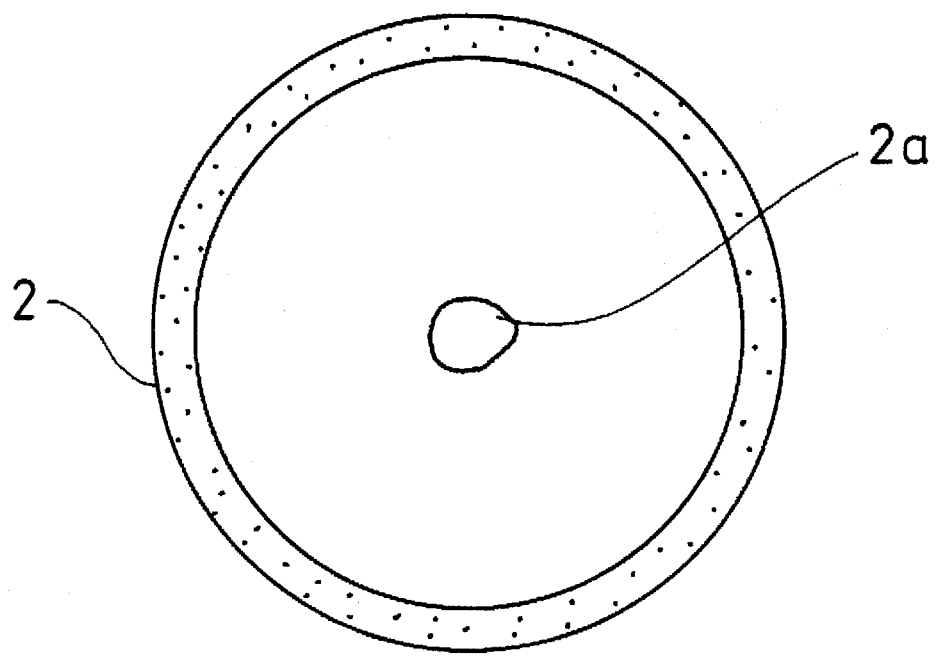
FIG. 6A to FIG. 6B are plane and side views each illustrating a gas hole generated in the surface of an optical element in a comparative example.
Figure 6B:
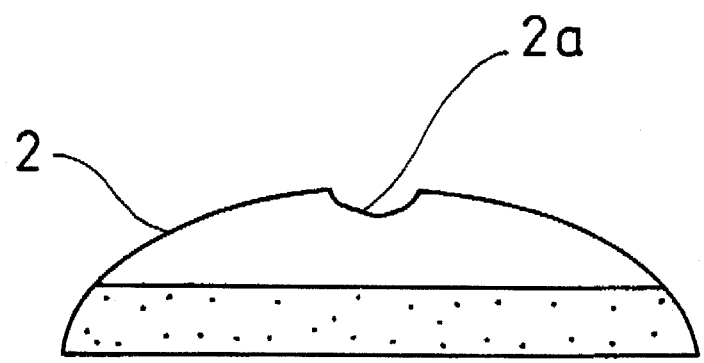

The blank 1 was set in the mold, and the heating sources were then turned on to heat the blank 1 for 70 seconds at each of 540° C., 580° C. and 570° C. Thus, the blank 1 was heated totally for 3.5 minutes. Upon completion of the heating, the surface viscosity of the blank 1 was equal to $10^{9.1}$ poise, representing that the surface of the blank 1 was softer than that in the specific example. Then, with the temperature of the heating sources maintained at 570° C., a force of 285 kgf was supplied to the pressurizing stage 6 and the upper die 3 begun to push the blank 1. As done in the specific example, five pressurizing operations were carried out, and each pressurizing operation was conducted such that the gas pressure in the closed space $3b$ was equal to 3.9 kgf/cm² as done in the specific example. However, there was formed in the transfer surface of the optical element 2 thus formed, a crater-like gas hole 2a having a diameter of about 150 μm as shown in FIG. 6A and FIG. 6B. The transfer precision was λ/2. In this comparative example, the blank 1 was heated to the extent that the surface thereof was softer than that in the specific example. As a result, the gas pressure in the closed space 3b produced a deformation in the blank 1. In the surface of the blank 1, such a deformation was produced in the form of a concave. Accordingly, the deformation could not be corrected by subsequent forming under pressure using the forming mold. Thus, the resulting optical element 2 was defective. Further, such a deformation due to gas pressure is irregular unlike a regular deformation due to the forming mold. Also, resulting optical elements are different from one another in the sizes and positions of crater-like concaves.

In the comparative example, the reason of why a concave was generated in the surface of the blank i, was because the gas pressure was too high. Accordingly, if the gas pressure is low in the comparative example, a good product must be formed. In this connection, the conditions of heating the optical element blank 1 were made identical with those in the comparative example such that the surface viscosity of the blank 1 at the time of deformation under pressure was brought to $10^{9.1}$ poise. Further, the pressurizing operation was carried out such that the gas pressure in the closed space 3b was equal to about 2.9 kgf/cm². As a result, the shape of the upper mold forming surface 3a was successfully transferred to the optical element blank 1 with no concave formed therein as done in the comparative example, and the transfer precision of the optical element 2 was λ/4.

Figure 7A:
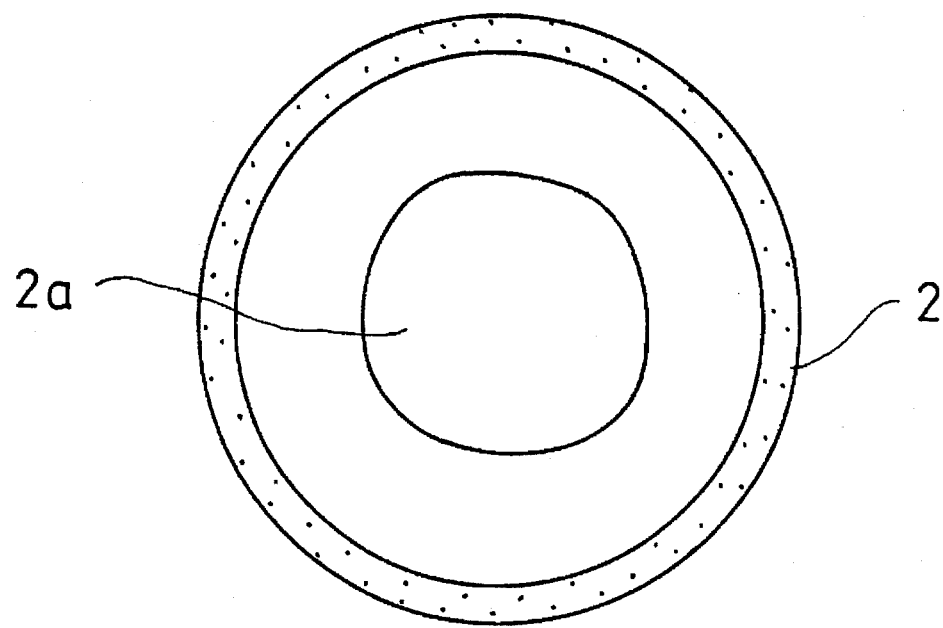
FIG. 7A to FIG. 7B are plane and side views each illustrating a gas hole generated in the surface of an optical element in another comparative example.
Figure 7B:
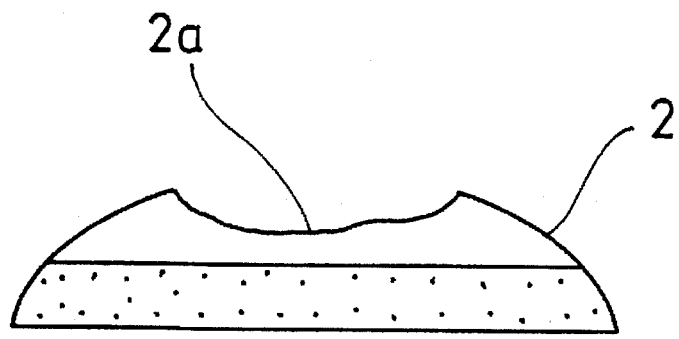

As mentioned earlier, however, it is neither good that the gas pressure in the closed space 3b is too low. As a matter of course, the blank with the surface viscosity of $10^{9.1}$ poise was pressurized such that the gas pressure in the closed space 3b was about 2.4 kgf/cm². The resulting optical element 2 presented, in the transfer surface thereof, a crater-like gas hole 2a having a diameter of about 3 mm as shown in FIG. 7A and FIG. 7B, and its transfer precision was about λ/1. This is because the gas pressure in the closed space 3b was too low to form the gas passage 3d between the blank 1 and the upper die 3 such that the gas caught in the closed space 3b could not be discharged outside even though the pressurizing force to be applied to the blank 1 was set to zero. As a result, the subsequent pressurizing operation was carried out with a high pressure of about 2.4 kgf/cm² remaining in the closed space 3b. This further increases the gas pressure in the closed space 3b to produce a detrimental concave in the blank 1. The caught gas was discharged from the closed space 3b at the time when the pressurizing force was brought to zero at the next time. At that time, however, the concave had already been produced in the blank 1. Accordingly, this concave still remained when the forming was completed.

As discussed in the foregoing, the results were good under the first forming condition (blank surface viscosity of $10^{10.2}$ poise, maximum pressure of caught gas of 3.9 kgf/cm²) and the third forming condition ($10^{9.1}$ poise, 2.9 kgf/cm²), but the results were not good under the second forming condition ($10^{9.1}$ poise, 3.9 kgf/cm²) and the fourth forming condition ($10^{9.1}$ poise, 2.4 kgf/cm²).

In an actual mass-production, to prevent the gas caught in the closed space from producing a detrimental deformation in the blank, tests may previously be conducted to determine the blank viscosity at the time of deformation under pressure, the change rate of the volume of the closed space at one pressurization (rate of increase in the gas pressure in the closed space), the own weight of the upper die and the like.

There are instances where the adhesion between the dies and the blank is very high and it is therefore required to apply a high pressure to the closed space in order to form a gas passage therebetween, so that such a high pressure possibly produces a detrimental concave in the blank. In such a case, it is effective that there is used, as the material of the dies, a material low in viscosity with respect to the blank, that the mold surfaces are coated with such a material, or that the blank is set to a slightly low temperature.

On the contrary, there are instances where the adhesion between the dies and the blank is very bad and consequently the dies are perfectly separated from the blank by the pressure of a high-pressure gas in the closed space, so that an adverse effect is possibly exerted to the forming precision. In such a case, it is effective that the own weight of the upper die is weighted, that there is used, as the material of the dies, a material having suitable viscosity with respect to the blank, that the mold surfaces are coated with such a material, or that the blank is set to a slightly high temperature.

Under the conditions determined based on the tests above-mentioned, an actual mass-production can be carried out to form optical elements stable in quality at all times. It is difficult to directly monitor and control the gas pressure in the closed space at the time of mass-production. Accordingly, this gas pressure is controlled by controlling the amount of displacement of the upper die. Further, it is also difficult to directly monitor the surface viscosity of the blank, but the surface viscosity can sufficiently be adjusted by controlling the temperature of each of the pressurizing stage, the forming stage and the dies. It is a matter of course that the forming method above-mentioned can also be applied to a convexo-convex lens, a meniscus lens and the like.

(Second Embodiment)

Figure 8:
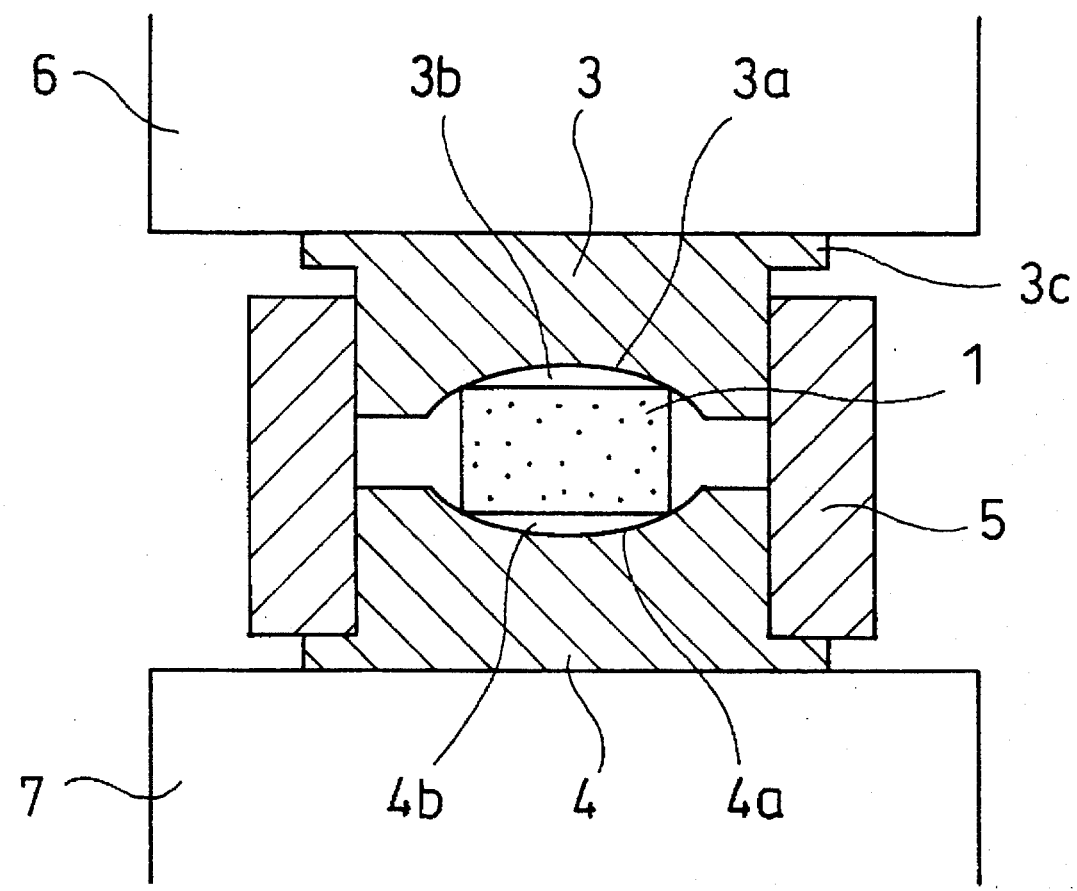
FIG. 8 is a section view of a forming apparatus used in a second embodiment of the present invention.
Figure 9:
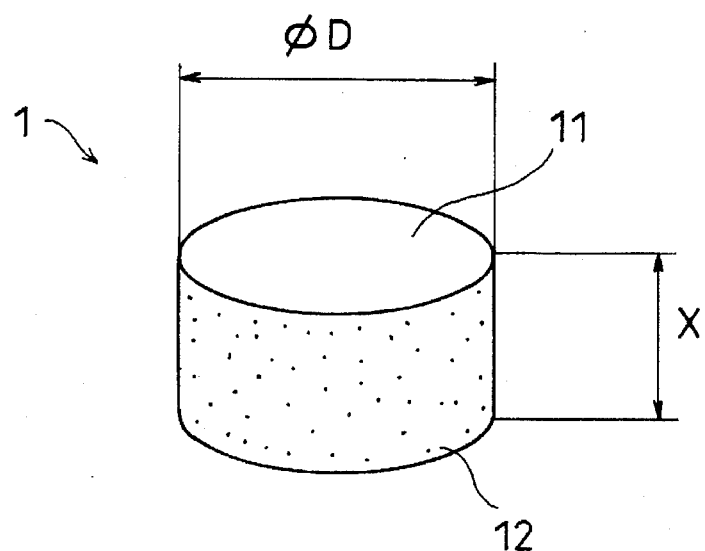
FIG. 9 is a perspective view of an optical element blank used in the second embodiment.
Figure 10:
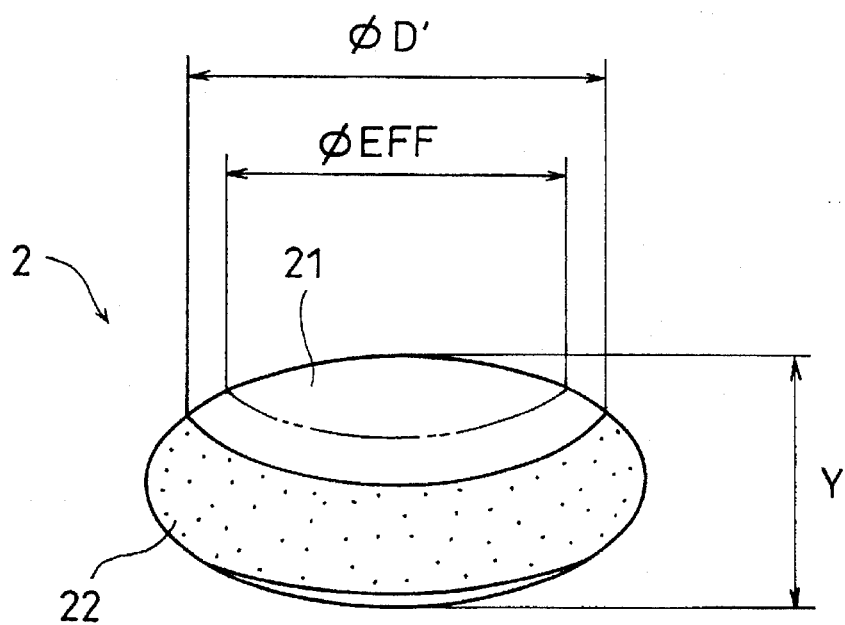
FIG. 10 is a perspective view of an optical element formed in the second embodiment.

A forming apparatus in FIG. 8 is different from the forming apparatus in FIG. 1 only in that the lower mold forming surface 4a is a concave surface in the second embodiment. As shown in FIG. 9, an optical element blank 1 is a cylindrical body having a pair of opposite end surfaces 11 which are mirror-finished surfaces, and a lateral coarse surface 12. As shown in FIG. 8, the blank 1 is placed in the forming mold such that the end surfaces 11 are respectively opposite to an upper mold forming surface 3a which is a concave surface, and to a lower mold forming surface 4a which is also a concave surface. Thus, there are formed a closed space 3b between the blank 1 and the upper die 3, and a closed space 4b between the blank 1 and the lower die 4. Then, the heating sources incorporated in the pressurizing stage 6 and the forming stage 7 are turned on to heat the blank 1 to a predetermined temperature, and a pressurizing force is applied to the upper die 3 in a pressurizing pattern as shown in FIG. 2. Thus, the blank 1 is formed into an optical element (convexo-convex lens) 2 which has a predetermined thickness, mirror surfaces 21 and a coarse surface 22, as shown in FIG. 10.

Here, as shown in FIG. 9, the center thickness of the optical element blank 1 is defined as X, and the diameter of each end surface or mirror surface as ∅D. Further, as shown in FIG. 10, the center thickness of the formed optical element 2 is defined as Y, and the diameter of each mirror surface 21 as ∅D'. It is noted that ∅D' is substantially equal to ∅D. In view of optical performance, the optically effective surface diameter ∅EFF of the optical element 2 is required to be not greater than ∅D'. That is, it is required that the coarse surface 22 is located outside of the optically effective surface of the optical element 2.

To satisfy such conditions, the second embodiment employs an optical element blank 1 which satisfies the requirements of X≦Y and ∅D≧∅EFF. When the volume of the optical element blank 1 is defined as V, the following equation is established:

$$\emptyset D = 2(V/\pi X)^{1/2}$$

The following description will discuss a specific example of forming an optical element (convexo-convex lens) 2 having the center thickness of 2.9 mm and an optically effective surface diameter of 6.86 mm.

The optical element blank 1 is a cylindrical body of optical glass VC-79 having a diameter of 7.1 mm and a thickness of 2.75 mm. The blank 1 was supplied onto the lower mold forming surface 4a, and the upper die 3 was then inserted along the trunk die 5 such that the upper mold forming surface 3a came in contact with the blank 1. At this time, the upper and lower peripheries of the blank 1 came in linear contact with the upper mold forming surface 3a and the lower mold forming surface 4a, respectively.

Then, the heating sources were turned on to heat the blank 1 for 3 minutes at 590° C. At this point of time, the surface viscosity of the blank 1 was $10^8$ poise.

While lowering the temperature of the heating sources to 570° C., pressure was supplied to the pressurizing stage 6 and the upper die 3 started pushing the optical element blank 1. There was adopted a pressurizing method presenting a pressurizing pattern as shown in FIG. 2, in which the pressure was set to zero several times during one cycle. More specifically, there were repeated, five times, the application of a pressure of 285 kgf for five seconds and stopping the application of pressure for one second. During such repetition, gas in the closed spaces 3b, 4b defined by the end surfaces of the blank 1 and the forming surfaces 3a, 4a, was discharged. In the course of deformation under pressure, the contact parts of the blank 1 with the upper and lower dies 3, 4, i.e., the deformed parts of the blank 1, were gradually enlarged toward the center of the blank 1, and the transfer of the shapes of the upper and lower forming surfaces 3a, 4a proceeded. Further, the blank 1 was so deformed as to be outwardly extended by pressures to be exerted thereto in the vertical directions. Further, the blank 1 was made such that its surface and its inside were different in viscosity (the surface having viscosity at which the blank 1 was deformed, while the inside having viscosity at which the blank 1 was not deformed). Thus, in the course of the deformation of the surface of the blank 1, force to be decomposed toward the centers of the end surfaces of the blank 1, raised the center portions of the blank 1.

At the final forming under pressure, with the pressurizing force maintained constant, pressure was supplied from the pressurizing stage 6 to the upper die 3 and the flange 3c of the upper die 3 was brought into close contact with the trunk die 5 previously adjusted such that the resulting optical element 2 had a desired thickness. About 40 seconds was taken before the upper die 3 came in close contact with the trunk die 5 after the pressure supply had started. At this point of time, the volume of the space defined by the dies was 315.23 mm$^3$ and the volume of the optical element (convexo-convex lens) 2 thus formed, was 108.88 mm$^3$, which presented a volume rate of 34.5% with respect to the volume of the space defined by the dies. Thus, the space defined by the dies was not fully occupied by the optical element 2, and the circumferences of the optical element 2 did not come in contact with the inner surface of the trunk die 5.

Then, when the pressurizing force was reduced to 55 kgf and the optical element 2 was cooled for two minutes to 480° C., the pressure supply was stopped to bring the pressurizing force to zero. When the temperature of the optical element 2 in the mold reached room temperature, the mold was opened and the optical element 2 was taken out.

The optical element 2 thus formed had the center thickness of 2.9 mm which was greater by 150 μm than the center thickness of the blank 1 of 2.75 mm. The relationship between the center thickness X (2.75 mm) of the blank 1 and the center thickness Y (2.9 mm) of the optical element 2, satisfied X≦Y. Further, the relationship between the diameter ⌀D (7.1 mm) of each mirror end surface 11 of the blank 1 and the optically effective surface diameter ⌀EFF (6.86 mm) of the optical element 2, satisfied ⌀D≧⌀EFF.

The forming method above-mentioned can be applied not only to a convexo-convex lens, but also a meniscus lens or the like.

We claim:

1. An optical element forming method comprising:

a step of heating an optical element blank placed in a forming mold to a temperature higher than the transition temperature of said blank; and a step of pressurizing said heated blank with a forming surface of said forming mold so as to give, to said blank, force to be decomposed toward the center of an end surface of said blank such that said blank is deformed, under pressure, to an optical element having the center thickness not less than the center thickness of said blank.

2. A method according to claim 1, further comprising a step of selecting a cylindrical body as the blank and a concave surface as the forming surface of the forming mold, and wherein, at the pressurizing step, said concave forming surface of said forming mold gives, to said blank, force to be decomposed toward the center of the end surface of said blank.

3. A method according to claim 1, further comprising a step of selecting, as the blank, a cylindrical body having (i) a lateral surface which is a coarse surface and (ii) mirror-finished end surfaces each having a diameter greater than the optically effective surface diameter of the optical element, such that said coarse surface is located outside of said optically effective surface of said optical element.

* * * * *